Oct. 31, 1950  G. H. COOK  2,528,212
OPTICAL OBJECTIVE
Filed Nov. 29, 1949
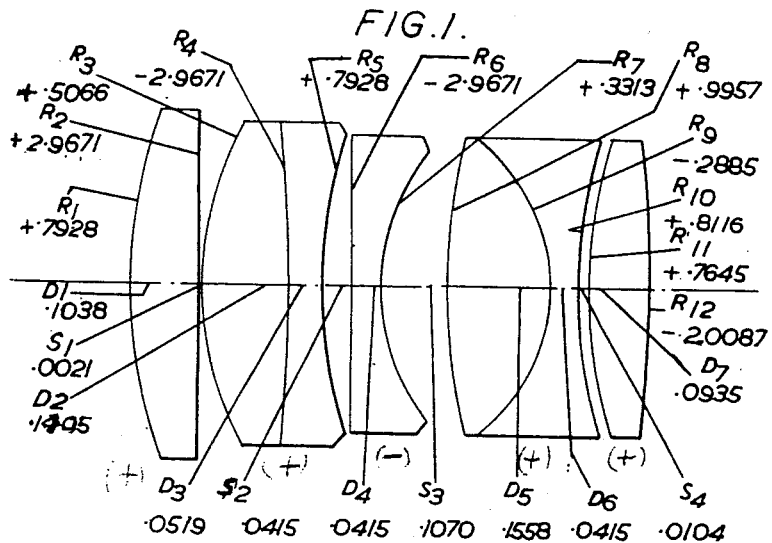
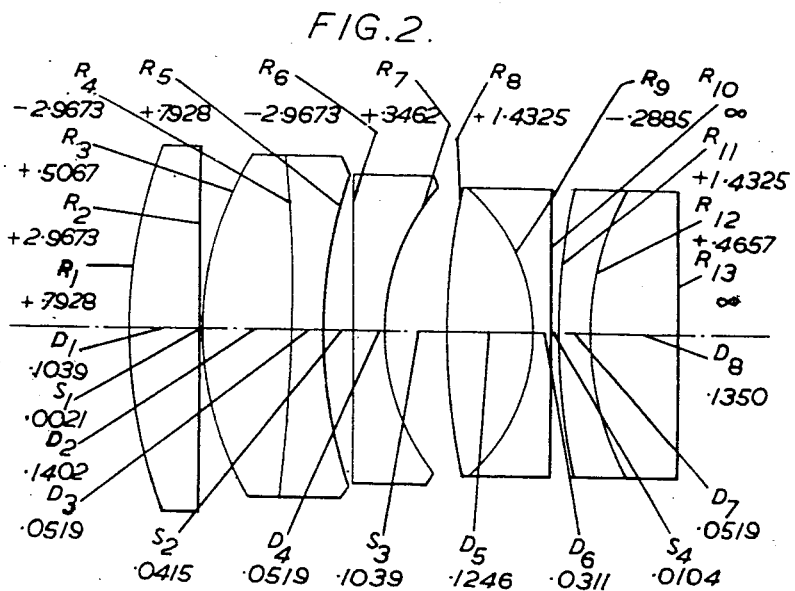
Inventor
GORDON H. COOK Patented Oct. 31, 1950

2,528,212

UNITED STATES PATENT OFFICE 2,528,212

OPTICAL OBJECTIVE

Gordon Henry Cook, Leicester, England, assignor to Taylor, Taylor & Hobson Limited, Leicester, England, a company of Great Britain Application November 29, 1949, Serial No. 129,976
In Great Britain November 29, 1948

17 Claims. (Cl. 88—57)

This invention relates to an optical objective for photographic or other purposes, corrected for spherical and chromatic aberrations, coma, astigmatism, field curvature and distortion, and has for its object to provide a wide-aperture objective having its aberrations highly corrected over a medium field and in particular having good correction for oblique spherical aberration and zonal coma. This also permits, if desired, an increase in the diameters of the various components beyond those necessary for the axial beam alone, in order to increase the amount of photographically useful light reaching extra-axial image points, whilst still maintaining off-axis aberrations within close limits.

The present applicant's copending United States of America application Serial No. 67,301 filed December 27, 1948, now Patent No. 2,502,509, dated April 4, 1950, relates to an objective of this kind comprising two members, of which the rear member is convergent with focal length greater than a half and less than four-fifths of the equivalent focal length of the whole objective and includes at least one convergent element and at least one divergent element, whilst the front member, whose focal length whether convergent or divergent is greater than five times the equivalent focal length of the whole objective, consists of a convergent doublet behind a simple convergent component and in front of a simple divergent component, such convergent doublet having a collective internal contact surface concave to the front of radius of curvature greater than the equivalent focal length of the objective, the mean refractive index of the material of the front element of such doublet exceeding that of the rear element thereof, the focal lengths of the two convergent components of the front member each being greater than the equivalent focal length of the whole objective and less than twice such focal length whilst the focal length of the divergent component of the front member is greater than a third and less than three-fifths of such equivalent focal length. The mean refractive index of the material of the front element of the convergent doublet is preferably greater than 1.64. The radius of curvature of the front surface of the convergent doublet of the front member preferably lies between .4 and .6 times the equivalent focal length of the objective. The specification of such copending application describes various embodiments of such invention, wherein the rear member consists of a simple component in the form of a doublet or a triplet.

The present invention relates to further embodiments of the invention of such copending application, and in the objective according to the present invention the rear member consists of at least two convergent components, at least one of which is compound.

In one convenient arrangement, the rear member consists of a convergent doublet component in front of a simple convergent component, the internal contact surface of the doublet component being collective and preferably concave to the front, the doublet consisting of a convergent element in front of a divergent element. The radius of curvature of such internal contact surface conveniently lies between a fifth and a half of the equivalent focal length of the objective, the mean refractive index of the material of the front element exceeding that of the rear element by at least .06. The front surface of the doublet is conveniently convex to the front with radius of curvature between a half and twice the equivalent focal length of the objective. The front surface of the rear single element is preferably convex to the front with radius of curvature between a half and twice the equivalent focal length of the objective, whilst the radius of curvature of the rear surface is greater than that of the front surface and greater than the equivalent focal length of the objective, such rear surface usually being concave to the front. The mean refractive index of this element preferably exceeds that of the adjacent element of the doublet component by at least .06.

In another arrangement, the rear member consists of two convergent doublets, each having a collective internal contact surface. Conveniently one of the internal contact surfaces is concave to the front and the other convex to the front, each doublet consisting of a convergent element and a divergent element. The radius of curvature of the convex cemented surface preferably lies between three tenths and one times the equivalent focal length of the objective, whilst that of the concave cemented surface lies between a fifth and a half of such focal length, the mean refractive index of the material of each convergent element exceeding that of the associated divergent element by at least .06. The radii of curvature of the rear surfaces of the two doublets, whether convex or concave to the front, are conveniently greater than twice the equivalent focal length of the objective, the front surface of at least one of the doublets being convex to the front.

In the accompanying drawings:

Figures 1 and 2 respectively illustrate two alternative constructions of objective according to the invention.

Numerical data for these examples are given in the following tables, in which $R_1$, $R_2$ ... represent the radii of curvature of the individual surfaces of the objective counting from the front (the positive sign indicating that the surface is convex to the front and the negative sign that it is concave thereto), $D_1, D_2 \ldots$ represent the axial thicknesses of the individual lens elements, and $S_1, S_2 \ldots$ represent the axial air separations between the elements. The tables also give the mean refractive indices for the D-line and the Abbé V numbers of the materials of which the lens elements are made.

*Example I*

| Equivalent focal length 1.000 | | Relative aperture F/1.86 | |
|---|---|---|---|
| Radius | Thickness or Air Separation | Refractive Index $n_D$ | Abbé V Number |
| $R_1+ .7928$ | $D_1$ .1038 | 1.6915 | 55.0 |
| $R_2+ 2.9671$ | $S_1$ .0021 | | |
| $R_3+ .5066$ | $D_2$ .1405 | 1.6915 | 55.0 |
| $R_4- 2.9671$ | $D_3$ .0519 | 1.6226 | 39.5 |
| $R_5+ .7928$ | $S_2$ .0415 | | |
| $R_6- 2.9671$ | $D_4$ .0415 | 1.6535 | 33.5 |
| $R_7+ .3313$ | $S_3$ .1070 | | |
| $R_8+ .9957$ | $D_5$ .1558 | 1.6915 | 55.0 |
| $R_9- .2885$ | $D_6$ .0415 | 1.5736 | 52.0 |
| $R_{10}+ .8116$ | $S_4$ .0104 | | |
| $R_{11}+ .7645$ | $D_7$ .0935 | 1.7181 | 48.1 |
| $R_{12}-2.0087$ | | | |

*Example II*

| Equivalent Focal Length 1.000 | | Relative Aperture F/1.8 | |
|---|---|---|---|
| Radius | Thickness or Air Separation | Refractive Index $n_D$ | Abbé V Number |
| $R_1 + .7928$ | $D_1$ .1039 | 1.6909 | 54.9 |
| $R_2 +2.9673$ | $S_1$ .0021 | | |
| $R_3 + .5067$ | $D_2$ .1402 | 1.6909 | 54.9 |
| $R_4 -2.9673$ | $D_3$ .0519 | 1.6227 | 36.0 |
| $R_5 + .7928$ | $S_2$ .0415 | | |
| $R_6 -2.9673$ | $D_4$ .0519 | 1.6535 | 33.5 |
| $R_7 + .3462$ | $S_3$ .1039 | | |
| $R_8 +1.4325$ | $D_5$ .1246 | 1.6909 | 54.9 |
| $R_9 - .2885$ | $D_6$ .0311 | 1.5740 | 52.0 |
| $R_{10}$ ∞ | $S_4$ .0104 | | |
| $R_{11}+1.4325$ | $D_7$ .0519 | 1.5740 | 52.0 |
| $R_{12}+ .4657$ | $D_8$ .1350 | 1.7170 | 48.0 |
| $R_{13}$ ∞ | | | |

These examples differ from one another primarily in the arrangement of the rear member. In Example I, the rear member consists of a cemented convergent doublet in front of a simple convergent component, the cemented surface $R_9$ in the doublet being collective and concave to the front. In Example II the rear member consists of two cemented convergent doublets, the cemented surface $R_9$ in the front doublet being concave to the front and the cemented surface $R_{12}$ in the rear doublet being convex to the front, both cemented surfaces being collective.

In both examples, the front member has three components of which the first is simple and convergent and the third simple and divergent, whilst the middle component consists of a convergent doublet containing a convergent element cemented in front of a divergent element, the cemented surface being collective and concave to the front with an index difference of .0682 across it.

The ratios of the focal lengths of the individual members and components to the equivalent focal length of the whole objective are for convenience set out in the following table, the positive sign indicating convergent power and the negative sign divergent power:

*Table of focal lengths*

| | Ex. I | Ex. II |
|---|---|---|
| Complete front member | ∞ | +15.0 |
| Front component thereof | +1.54 | +1.54 |
| Middle component thereof | +1.39 | +1.39 |
| Rear component thereof | −.45 | −.47 |
| Complete rear member | +.63 | +.66 |
| Front component thereof | +2.30 | +1.15 |
| Rear component thereof | +1.78 | +1.42 |

It will be noticed that in both examples the mean refractive index of each convergent element of a compound component exceeds that of the divergent element cemented to it by more than .06.

In Example II, the two doublets of the rear member are both plano-convex, but it is not essential that the rear surfaces of these doublets should be plane and they may be either concave or convex. In the front doublet of the rear member in this example, the convergent element is cemented in front of the divergent element, whilst in the rear doublet the convergent element is behind the divergent element.

What I claim as my invention and desire to secure by Letters Patent is:

1. An optical objective for photographic or other purposes, corrected for spherical and chromatic aberrations, coma, astigmatism, field curvature and distortion, and comprising two members, of which the rear member is convergent with focal length greater than half and less than four-fifths of the equivalent focal length of the whole objective and consists of at least two convergent components at least one of which is compound and includes a divergent element, whilst the front member whose focal length is greater than five times the equivalent focal length of the whole objective, consists of a convergent doublet behind a simple convergent component and in front of a simple divergent component, such convergent doublet having a collective internal contact surface concave to the front of radius of curvature greater than the equivalent focal length of the objective, the mean refractive index of the material of the front element of such doublet exceeding that of the rear element thereof, the focal lengths of the two convergent components of the front member each being greater than the equivalent focal length of the whole objective and less than twice such focal length, whilst the focal length of the divergent component of the front member is greater than a third and less than three-fifths of such equivalent focal length.

2. An optical objective as claimed in claim 1, in which the mean refractive index of the material of the front element of the convergent doublet in the front member is greater than 1.64, and the radius of curvature of the front surface of the convergent doublet of the front member lies between .4 and .6 times the equivalent focal length of the objective.

3. An optical objective as claimed in claim 1, in which the rear member consists of a convergent doublet component in front of a simple convergent component, the internal contact surface of the doublet component being collective, and concave to the front with radius of curvature between a fifth and a half of the equivalent focal length of the objective, the mean refractive index of the material of the front element of such doublet exceeding that of the rear element thereof by at least .06.

4. An optical objective as claimed in claim 3, in which the mean refractive index of the material of the front element of the convergent doublet in the front member is greater than 1.64, and the radius of curvature of the front surface of the convergent doublet of the front member lies between .4 and .6 times the equivalent focal length of the objective.

5. An optical objective for photographic or other purposes, corrected for spherical and chromatic aberrations, coma, astigmatism, field curvature and distortion, and comprising two members, of which the rear member is convergent with focal length greater than half and less than four-fifths of the equivalent focal length of the whole objective and consists of a convergent doublet component which includes a divergent element and is positioned in front of a simple convergent component, the internal contact surface of the doublet component being collective, whilst the front member whose focal length is greater than five times the equivalent focal length of the whole objective, consists of a convergent doublet behind a simple convergent component and in front of a simple divergent component, such convergent doublet having a collective internal contact surface concave to the front of radius of curvature greater than the equivalent focal length of the objective, the mean refractive index of the material of the front element of such doublet exceeding that of the rear element thereof, the focal lengths of the two convergent components of the front member each being greater than the equivalent focal length of the whole objective and less than twice such focal length, whilst the focal length of the divergent component of the front member is greater than a third and less than three-fifths of such equivalent focal length.

6. An optical objective as claimed in claim 5, in which the front surface of the doublet of the rear member is convex to the front with radius of curvature between a half and twice the equivalent focal length of the objective.

7. An optical objective as claimed in claim 6, in which the mean refractive index of the material of the front element of the convergent doublet in the front member is greater than 1.64, and the radius of curvature of the front surface of the convergent doublet of the front member lies between .4 and .6 times the equivalent focal length of the objective.

8. An optical objective as claimed in claim 5, in which the front surface of the simple convergent component of the rear member is convex to the front with radius of curvature between a half and twice the equivalent focal length of the objective, whilst the radius of curvature of the rear surface of such component is greater than that of the front surface and greater than the equivalent focal length of the objective, such rear surface being concave to the front.

9. An optical objective as claimed in claim 8, in which the mean refractive index of the material of the front element of the convergent doublet in the front member is greater than 1.64, and the radius of curvature of the front surface of the convergent doublet of the front member lies between .4 and .6 times the equivalent focal length of the objective.

10. An optical objective as claimed in claim 5, in which the mean refractive index of the material of the simple convergent component of the rear member exceeds that of the adjacent element of the doublet component by at least .06.

11. An optical objective as claimed in claim 10, in which the mean refractive index of the material of the front element of the convergent doublet in the front member is greater than 1.64, and the radius of curvature of the front surface of the convergent doublet of the front member lies between .4 and .6 times the equivalent focal length of the objective.

12. An optical objective as claimed in claim 1, in which the rear member consists of two convergent doublets, each having a collective internal contact surface.

13. An optical objective as claimed in claim 12, in which each of the doublets in the rear member consists of a convergent element cemented to a divergent element, one of the cemented surfaces being concave to the front and the other convex to the front.

14. An optical objective as claimed in claim 13, in which the radius of curvature of the convex cemented surface lies between three-tenths and one times the equivalent focal length of the objective and that of the concave cemented surface lies between a fifth and a half of such focal length, the mean refractive index of the material of the convergent element of each doublet exceeding that of the associated divergent element by at least .06.

15. An optical objective as claimed in claim 14, in which the mean refractive index of the material of the front element of the convergent doublet in the front member is greater than 1.64, and the radius of curvature of the front surface of the convergent doublet of the front member lies between .4 and .6 times the equivalent focal length of the objective.

16. An optical objective as claimed in claim 1, in which the rear member consists of two convergent doublets, each having a collective internal contact surface, and in which the radii of curvature of the rear surfaces of the two doublets are greater than twice the equivalent focal length of the objective, the front surface of at least one of the doublets being convex to the front.

17. An optical objective as claimed in claim 16, in which the mean refractive index of the material of the front element of the convergent doublet in the front member is greater than 1.64, and the radius of curvature of the front surface of the convergent doublet of the front member lies between .4 and .6 times the equivalent focal length of the objective.

GORDON HENRY COOK.

REFERENCES CITED

The following references are of record in the file of this patent:

UNITED STATES PATENTS

| Number | Name | Date |
| --- | --- | --- |
| 1,839,011 | Bielicke | Dec. 29, 1931 |
| 2,106,077 | Tronnier | Jan. 18, 1938 |
| 2,348,667 | Warmisham | May 9, 1944 |
| 2,502,509 | Cook | Apr. 4, 1950 |